United States Patent
Kobayashi

(10) Patent No.: US 9,432,538 B2
(45) Date of Patent: Aug. 30, 2016

(54) IMAGE FORMING APPARATUS, DOCUMENT SHEET SIZE DETECTION METHOD

(71) Applicant: KYOCERA Document Solutions Inc., Osaka-shi, Osaka (JP)

(72) Inventor: Yuya Kobayashi, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/781,015

(22) PCT Filed: Oct. 30, 2014

(86) PCT No.: PCT/JP2014/078884
§ 371 (c)(1),
(2) Date: Sep. 28, 2015

(87) PCT Pub. No.: WO2015/093153
PCT Pub. Date: Jun. 25, 2015

(65) Prior Publication Data
US 2016/0057294 A1 Feb. 25, 2016

(30) Foreign Application Priority Data

Dec. 20, 2013 (JP) ................................. 2013-264374

(51) Int. Cl.
*H04N 1/00* (2006.01)
*G03B 27/50* (2006.01)
(Continued)

(52) U.S. Cl.
CPC ............ *H04N 1/0071* (2013.01); *G03B 27/50* (2013.01); *G03B 27/62* (2013.01); *H04N 1/0074* (2013.01);
(Continued)

(58) Field of Classification Search
None
See application file for complete search history.

(56) References Cited

U.S. PATENT DOCUMENTS 5,693,933 A * 12/1997 Takasu ............... H04N 1/00681
250/208.1
8,269,993 B2 * 9/2012 Takatani ............ H04N 1/00347
345/158
(Continued)

FOREIGN PATENT DOCUMENTS

JP 03181271 A 8/1991
JP 07140433 A 6/1995
(Continued)

OTHER PUBLICATIONS

Machine translation of JP2001036695 to Sakai et al., published Feb. 2001.*
(Continued)

*Primary Examiner* — Paul F Payer
(74) *Attorney, Agent, or Firm* — Alleman Hall McCoy Russell & Tuttle LLP

(57) ABSTRACT

An image forming apparatus that includes: an image reading portion capable of reading image data of the document sheet; document sheet detection sensors; an ADF including a document holding surface on which first and second areas having different reflection characteristics and third and fourth areas having different reflection characteristics are formed; a first reading control portion that causes the image reading portion to read image data of both the first and second areas when the ADF is closed; a first document sheet width detection portion that detects a width of the document sheet based on the image data read from the first area or the image data read from the second area; and a first size detection portion capable of detecting the size of the document sheet based on detection results from the first document sheet width detection portion and the document sheet detection sensors.

9 Claims, 6 Drawing Sheets

(51) Int. Cl.
    *G03B 27/62* (2006.01)
    *H04N 1/04* (2006.01)
    *H04N 1/10* (2006.01)
(52) U.S. Cl.
    CPC ........ *H04N 1/0075* (2013.01); *H04N 1/00551* (2013.01); *H04N 1/00708* (2013.01); *H04N 1/00753* (2013.01); *H04N 1/00766* (2013.01); *H04N 1/04* (2013.01); *H04N 1/10* (2013.01); *H04N 1/1039* (2013.01); *H04N 1/1061* (2013.01); *H04N 1/1017* (2013.01); *H04N 2201/0094* (2013.01)

(56) References Cited

U.S. PATENT DOCUMENTS 8,503,041 B2 * 8/2013 Kim .................. H04N 1/00681
                                                     271/227
8,988,743 B2 * 3/2015 Ueno ................ H04N 1/00681
                                                     358/445

FOREIGN PATENT DOCUMENTS

| JP | 11075025 A | | 3/1999 |
| JP | 11125872 A | | 5/1999 |
| JP | 11205547 A | | 7/1999 |
| JP | 2000138798 A | * | 5/2000 |
| JP | 2001036695 A | | 2/2001 |
| JP | 2009194762 A | | 8/2009 |

OTHER PUBLICATIONS

Machine translation of JPH1175025 to Higashiura et al., published Mar. 1999.*

Machine translation of JP2000138798 to Takai et al., published May 2000.*

ISA Japanese Patent Office, International Search Report Issued in Application No. PCT/JP2014/078884, Feb. 3, 2015, WIPO, 4 pages.

* cited by examiner

IMAGE FORMING APPARATUS, DOCUMENT SHEET SIZE DETECTION METHOD

TECHNICAL FIELD

The present invention relates to an image forming apparatus and a method for detecting the size of a document sheet, each of which enabling detection of the size of a document sheet placed on a document sheet placement surface.

BACKGROUND ART

In an image forming apparatus including a scanner or the like that can read an image of a document sheet, the size of a document sheet placed on a document sheet placement surface is detected before an image reading process is executed in some cases. For example, a technology of detecting the size of both whitish and blackish document sheets by emitting light from a reading unit immediately before or after a document sheet cover is closed by a user to read image data, and identifying the edge of a document sheet based on the read image data is known (e.g., see Patent Literature 1).

CITATION LIST

Patent Literature

[PTL 1] Japanese Laid-Open Patent Publication No. 11-125872

SUMMARY OF THE INVENTION

Problems to be Solved by the Invention

However, with the pertinent technology described above, the size of the document sheet cannot be detected for a whitish document sheet when the document sheet cover is closed, since the edge of the document sheet is identified based on a difference generated between the document sheet and the document sheet cover regarding the amount of reflected light when the document sheet cover is open. Thus, a problem occurs when, for example, a whitish document sheet is placed on the document sheet placement surface and the document sheet cover is closed by the user while the power of an image forming apparatus is turned off. In such a case, the user had to open and close the document sheet cover in order to cause the image forming apparatus, whose power has been turned on, to detect the size of the document sheet. Furthermore, the same problem occurs when a whitish document sheet is placed on the document sheet placement surface and the document sheet cover is closed by the user while the image forming apparatus is in a sleep mode.

An object of the present invention is to provide an image forming apparatus and a method for detecting the size of a document sheet, each of which enabling detection of the size of a document sheet placed on a document sheet placement surface without the need of an operation of opening-and-closing a document sheet cover.

Solution to the Problems

An image forming apparatus according to one aspect of the present invention includes an image reading portion, two document sheet detection portions, a document sheet cover, a first reading control portion, a first document sheet width detection portion, and a first size detection portion. The image reading portion is capable of reading image data of a document sheet placed on a document sheet placement surface. The two document sheet detection portions are configured to detect reflected light when light is emitted on a document sheet through the document sheet placement surface, and are disposed at positions that are mutually separated in a main scanning direction on the document sheet placement surface and that are both separated from a predetermined placement reference position on the document sheet placement surface by a predetermined distance in a sub scanning direction. The document sheet cover includes a document holding surface that faces the document sheet placement surface and on which first and second areas that are both shaped to be long in the main scanning direction, that are mutually separated in the sub scanning direction, and that have different reflection characteristics, and third and fourth areas that are formed at positions corresponding to irradiation positions of light from the two document sheet detection portions and that have different reflection characteristics, are formed. The first reading control portion is configured to cause the image reading portion to read image data of each of the first and second areas when the document sheet cover is closed with respect to the document sheet placement surface. The first document sheet width detection portion is configured to detect, as a width of the document sheet in the main scanning direction, a width that is larger between a width, specified based on the image data read from the first area by the first reading control portion, of the document sheet in the main scanning direction, and a width, specified based on the image data read from the second area by the first reading control portion, of the document sheet in the main scanning direction. The first size detection portion is capable of detecting a size of the document sheet placed on the document sheet placement surface based on detection results from the first document sheet width detection portion and the two document sheet detection portions.

A method for detecting a size of a document sheet according to another aspect of the present invention is a method executed by an image reading apparatus including: an image reading portion capable of reading image data of a document sheet placed on a document sheet placement surface; two document sheet detection portions configured to detect reflected light when light is emitted on a document sheet through the document sheet placement surface, and disposed at positions that are mutually separated in a main scanning direction on the document sheet placement surface and that are both separated from a predetermined placement reference position on the document sheet placement surface by a predetermined distance in a sub scanning direction; and a document sheet cover including a document holding surface that faces the document sheet placement surface and on which first and second areas that are both shaped to be long in the main scanning direction, that are mutually separated in the sub scanning direction, and that have different reflection characteristics, and third and fourth areas that are formed at positions corresponding to irradiation positions of light from the two document sheet detection portions and that have different reflection characteristics, are formed. The method includes a first step, a second step, and a third step described in the following. At the first step, image data is read from each of the first and second areas by the image reading portion when the document sheet cover is closed with respect to the document sheet placement surface. At the second step, detected as a width of the document sheet in the main scanning direction is a width that is larger between a width, specified based on the image data read from the first area at the first step, of the document sheet in the main scanning direction, and a width, specified based on the image data read from the second area at the first step, of the document sheet in the main scanning direction. At the third step, the size of the document sheet placed on the document sheet placement surface can be detected based on detection results from the second step and the two document sheet detection portions.

Advantageous Effects of the Invention

With the present invention, it becomes possible to detect the size of a document sheet placed on a document sheet placement surface without the need of an operation of opening-and-closing a document sheet cover.

DESCRIPTION OF EMBODIMENTS

In the following, embodiments of the present invention will be described with reference to the accompanying drawings for the purpose of better understanding of the present invention. It should be noted that the following embodiments are examples realizing the present invention and, by nature, do not limit the technical scope of the present invention.

[Outlined Configuration of Image Forming Apparatus 10]

Figure 1A:
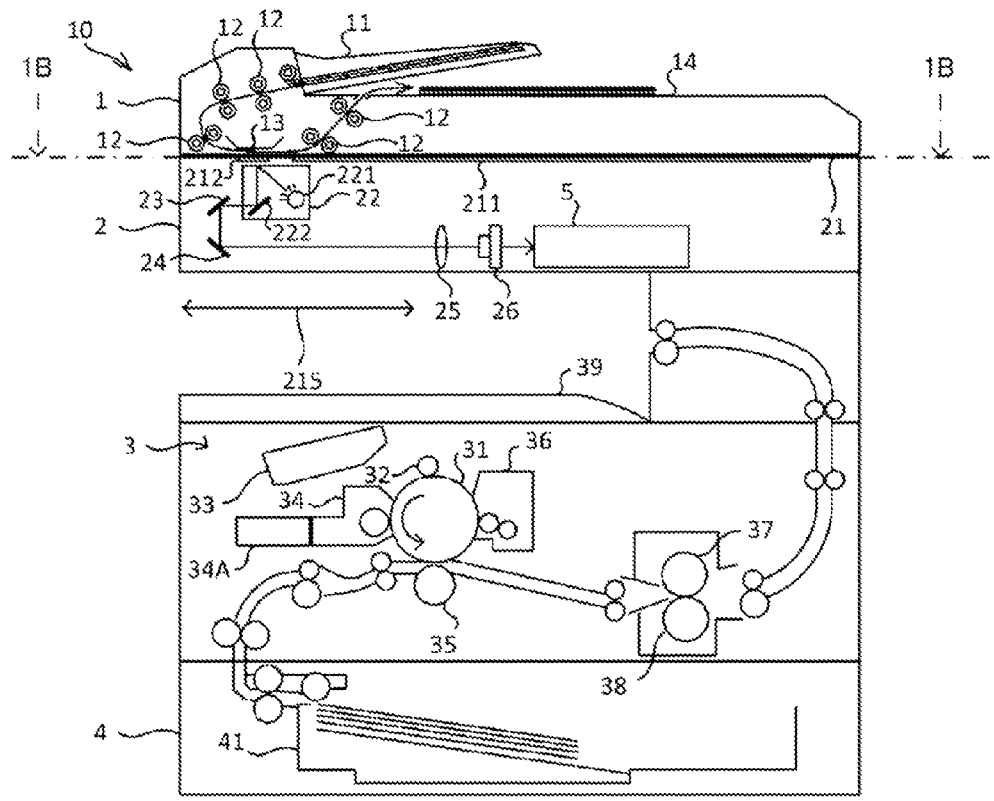
FIG. 1A shows a configuration of an image forming apparatus according to an embodiment of the present invention.

First, with reference to FIGS. 1 to 3, an outlined configuration of an image forming apparatus 10 according to an embodiment of the present invention will be described. As shown in FIGS. 1A and 3, the image forming apparatus 10 includes an ADF 1, an image reading portion 2, an image forming portion 3, a sheet feed portion 4, a control portion 5, and an operation display portion 7. The image forming apparatus 10 is a multifunctional peripheral having multiple functions such as a scanning function of reading image data from a document sheet as well as a printer function, a facsimile function, or a copy function. In the image forming apparatus 10, a configuration including the ADF 1, the image reading portion 2, and the control portion 5 is one example of an image reading apparatus according to the present invention. In addition, the present invention is applicable to an image reading apparatus or an image forming apparatus such as a scanner device, a facsimile device, and a copy machine.

The image forming portion 3 is an electrophotographic image forming portion that executes an image formation process (printing process) based on image data read by the image reading portion 2 or image data inputted from an information processing apparatus such as an external personal computer. Specifically, as shown in FIG. 1A, the image forming portion 3 includes a photosensitive drum 31, a charging device 32, an exposure device (LSU) 33, a developing device 34, a transfer roller 35, a cleaning device 36, a fixing roller 37, a pressurizing roller 38, and a sheet discharge tray 39. In the image forming portion 3, an image is formed by the following procedure on a paper sheet fed from a sheet feed cassette 41 that is detachable with respect to the sheet feed portion 4. Then, the paper sheet, on which the image is formed, is discharged to the sheet discharge tray 39.

First, the photosensitive drum 31 is uniformly charged to a predetermined electric potential by the charging device 32. Next, the surface of the photosensitive drum 31 is irradiated by the exposure device 33 using light that is based on the image data. With this, an electrostatic latent image corresponding to the image data is formed on the surface of the photosensitive drum 31. Then, the electrostatic latent image on the photosensitive drum 31 is developed (visualized) as a toner image by the developing device 34. Toner (developer) is supplied to the developing device 34 from a toner container 34A that is detachable with respect to the image forming portion 3. Subsequently, the toner image formed on the photosensitive drum 31 is transferred onto a paper sheet by the transfer roller 35. Then, the toner image transferred onto the paper sheet is melted and fixed after being heated by the fixing roller 37 when the paper sheet passes between the fixing roller 37 and the pressurizing roller 38. Any toner remaining on the surface of the photosensitive drum 31 is removed by the cleaning device 36.

The control portion 5 includes control instruments such as a CPU, a ROM, a RAM, and an EEPROM which are not shown. The CPU is a processor for executing various computation processes. The ROM is a nonvolatile storage portion on which information such as control programs for causing the CPU to execute various processes are stored in advance. The RAM is a volatile storage portion, and the EEPROM is a nonvolatile storage portion. The RAM and the EEPROM are used as temporary storage memories (working areas) for various processes to be executed by the CPU. The control portion 5 performs overall control of the image forming apparatus 10 using the CPU by executing various control programs stored in the ROM in advance. The control portion 5 may be configured as an electronic circuit such as an integrated circuit (ASIC), or may be a control portion provided separately from a main control portion that performs overall control of the image forming apparatus 10.

The operation display portion 7 includes a display portion such as a liquid crystal display for displaying various information in accordance with control instructions from the control portion 5, and an operation portion such as a hardware key or a touch panel for inputting various information to the control portion 5 in accordance with a user operation.

The image reading portion 2 is an image reading portion that can read image data from a document sheet. Specifically, as shown in FIGS. 1A and 1B, the image reading portion 2 includes a document sheet table 21, a reading unit 22, mirrors 23 and 24, an optical lens 25, a CCD (Charge Coupled Device) 26, an opening-and-closing detection sensor 27, a pre-closure detection sensor 28, and document sheet detection sensors 29A and 29B.

Figure 1B:
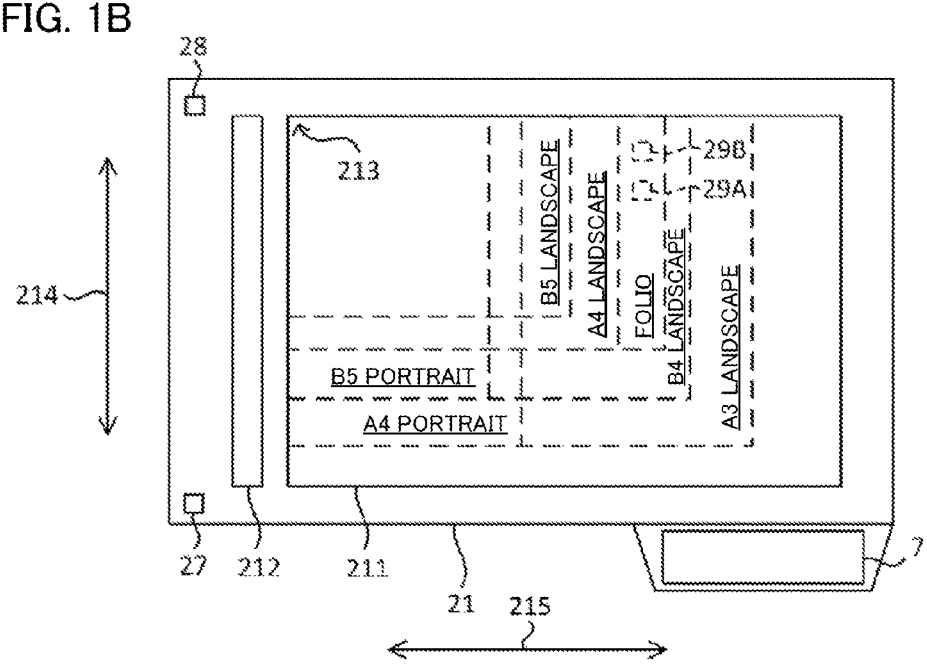
FIG. 1B shows a configuration of the image forming apparatus according to the embodiment of the present invention.

The document sheet table 21 is disposed on the top surface of the image reading portion 2, and includes a document sheet placement surface 211 and a conveying-and-reading surface 212 as shown in FIG. 1B. The document sheet placement surface 211 is a translucent contact glass on which a document sheet can be placed as an image data reading target. On the document sheet placement surface 211, document sheets with various sizes are placed in conformity with a predetermined placement reference position 213. Specifically, on the document sheet placement surface 211, document sheets having sizes of B5 portrait, A4 portrait, B5 landscape, A4 landscape, Folio, B4 landscape, and A3 landscape, can be placed. The conveying-and-reading surface 212 is a glass that is for conveying and reading and that allows transmission of light emitted from the reading unit 22 to a document sheet conveyed by the ADF 1.

The reading unit 22 includes a light source 221 and a mirror 222, and is movable in a sub scanning direction 215 (right-left direction in FIG. 1A) by a moving mechanism (not shown) using a drive portion such as a stepping motor. When the reading unit 22 is moved in the sub scanning direction 215 by the drive portion, light emitted from the light source 221 onto the document sheet table 21 is used for scanning in the sub scanning direction 215.

The light source 221 includes multiple white LEDs arranged in a main scanning direction 214 (depth direction in FIG. 1A). Then, the light source 221 irradiates a document sheet with white light for an amount corresponding to a single line in the main scanning direction 214 by causing the white light to pass through the document sheet placement surface 211 or the conveying-and-reading surface 212 of the document sheet table 21. A position irradiated by light from the light source 221 is a reading position where image data is read by the image reading portion 2, and the reading position moves in the sub scanning direction 215 in association with a movement of the reading unit 22 in the sub scanning direction 215. Specifically, when image data is to be read from a document sheet placed on the document sheet placement surface 211, the reading unit 22 is moved to a position where the light from the light source 221 passes through the document sheet placement surface 211. Furthermore, when image data is to be read from a document sheet conveyed by the ADF 1, the reading unit 22 is moved to a position where the light from the light source 221 passes through the conveying-and-reading surface 212.

The mirror 222 reflects, toward the mirror 23, light that has been emitted from the light source 221 and reflected on the surface of the document sheet at the reading position on the document sheet table 21. Then, the light reflected by the mirror 222 is guided to the optical lens 25 by the mirrors 23 and 24. The optical lens 25 condenses the incoming light from the mirror 24 and causes the light to enter the CCD 26.

The CCD 26 is an image sensor including a photoelectric conversion element that converts received light into an electrical signal (voltage) corresponding to the amount of the light, and outputs the electrical signal as image data. The CCD 26 inputs, to the control portion 5 as the image data of the document sheet, the electrical signal based on the reflected light that has been reflected from document sheet and entered thereto when light has been emitted from the light source 221.

As shown in FIG. 1B, the opening-and-closing detection sensor 27 is disposed on the document sheet table 21, and is a mechanical switch for detecting open/closed states of the ADF 1 with respect to the document sheet table 21. Specifically, the opening-and-closing detection sensor 27 outputs, to the control portion 5, electrical signals corresponding to the open state and the closed state of the ADF 1. It should be noted that the opening-and-closing detection sensor 27 may be an optical sensor.

The pre-closure detection sensor 28 is a sensor that detects that the ADF 1 is closed down to a predetermined pre-closure angle. For example, when the ADF 1 is closed down to the pre-closure angle, the pre-closure detection sensor 28 is a mechanical switch that is configured to make contact with the ADF 1 and can output an electrical signal indicating a closing operation of the ADF 1. Here, when the angle of the ADF 1 with respect to the document sheet placement surface 211 when the ADF 1 is closed is defined as 0 degrees, the pre-closure angle is, for example, 10 to 20 degrees. The electrical signal outputted from the pre-closure detection sensor 28 is inputted to the control portion 5.

As shown in FIG. 1B, the document sheet detection sensors 29A and 29B are disposed at positions that are mutually separated in the main scanning direction 214 on the document sheet placement surface 211 and that are both separated from the placement reference position 213 on the document sheet placement surface 211 by a predetermined distance in the sub scanning direction 215. The document sheet detection sensors 29A and 29B are two sensors configured to detect light reflected when light is emitted onto a document sheet via the document sheet placement surface 211. Here, the distance is larger than a distance in the sub scanning direction 215 between end parts of an A4 landscape size document sheet placed on the document sheet placement surface 211 in conformity with the placement reference position 213, but is smaller than a distance in the sub scanning direction 215 between end parts of a Folio size document sheet. Specifically, each of the document sheet detection sensors 29A and 29B is a reflection type optical sensor that is disposed at the bottom part of the image reading portion 2 and includes a light emitting portion and a light receiving portion. Each of the document sheet detection sensors 29A and 29B can, by emitting light from the light emitting portion, output an electrical signal from the light receiving portion in accordance with the presence or absence of a document sheet at a position irradiated by light from the light emitting portion. The electrical signal outputted from the document sheet detection sensors 29A or 29B is inputted to the control portion 5. The document sheet detection sensors 29A and 29B represent one example of two document sheet detection portions.

Figure 2:
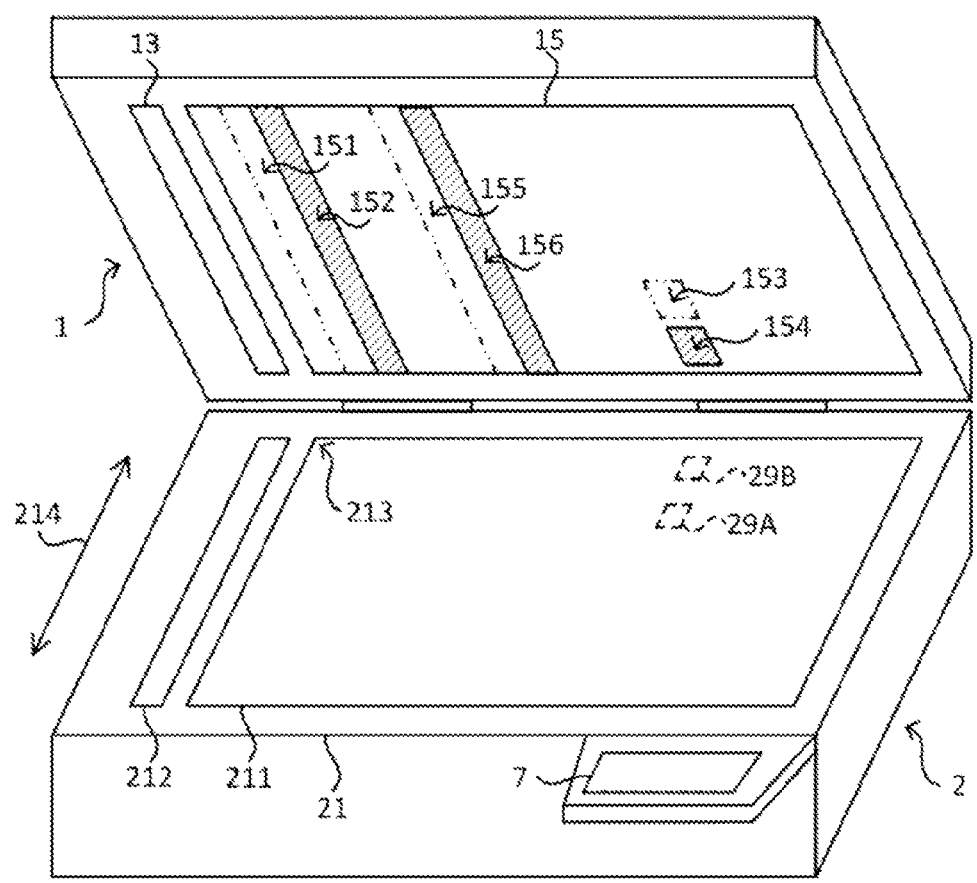
FIG. 2 shows a configuration of an ADF of the image forming apparatus according to the embodiment of the present invention.
Figure 3:
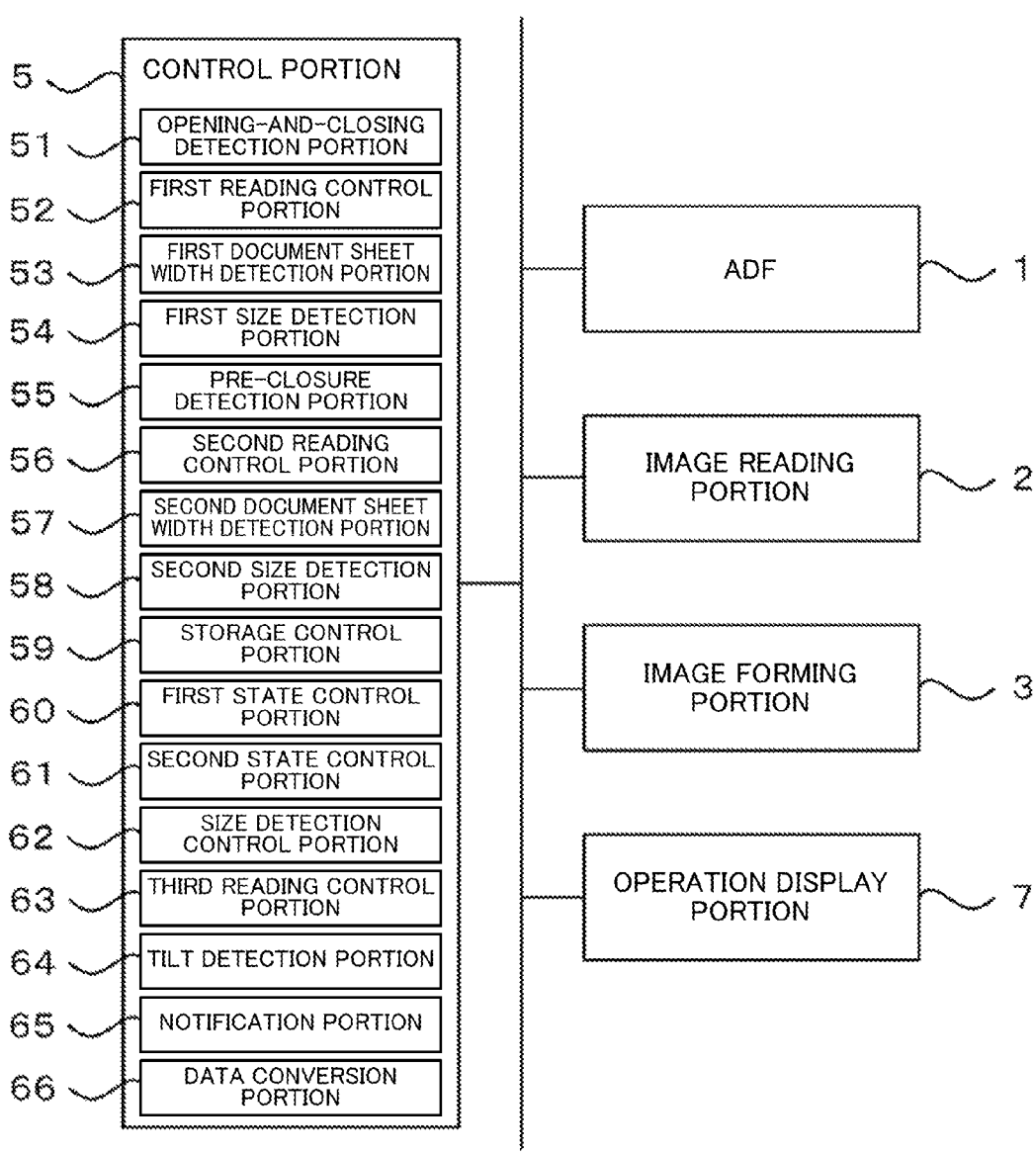
FIG. 3 is a block diagram showing a system configuration of the image forming apparatus according to the embodiment of the present invention.

As shown in FIGS. 1A and 2, the ADF 1 is an automatic document sheet conveying device including a document sheet set portion 11, multiple conveying rollers 12, a document holder 13, a sheet discharge portion 14, and a document holding surface 15. The ADF 1 is supported so as to be openable or closable with respect to the document sheet table 21, and acts also as a document sheet cover for a document sheet placed on the document sheet placement surface 211. In the ADF 1, each of the conveying rollers 12 is driven by a motor that is not shown to convey a document sheet placed on the document sheet set portion 11 to the sheet discharge portion 14 after passing by a position where image data is read by the image reading portion 2. With this, the image reading portion 2 can read image data from a document sheet conveyed by the ADF 1. Here, the ADF 1 is one example of a document sheet cover.

A technology is known regarding detecting the size of both whitish and blackish document sheets by reading image data from a document sheet immediately before or after the ADF 1 is closed by a user, and identifying the edge of the document sheet based on the read image data. However, with the pertinent technology described above, the size of the document sheet cannot be detected for a whitish document sheet when the ADF 1 is closed, since the edge of document sheet is identified based on a difference generated between the document sheet and the document holding surface 15 regarding the amount of reflected light when the ADF 1 is open. Thus, a problem occurs when, for example, a whitish document sheet is placed on the document sheet placement surface 211 and the ADF 1 is closed by the user while the power of the image forming apparatus 10 is turned off. In such a case, the user had to open and close the ADF 1 in order to cause the image forming apparatus 10, whose power has been turned on, to detect the size of the document sheet. Furthermore, the same problem occurs when a whitish document sheet is placed on the document sheet placement surface 211 and the ADF 1 is closed by the user while the image forming apparatus 10 is in a sleep mode. On the other hand, by providing multiple areas with different reflection characteristics on the document holding surface 15 of the ADF 1 of the image forming apparatus 10, the size of a whitish document sheet placed on the document sheet placement surface 211 can be detected even when the ADF 1 is closed.

Specifically, as shown in FIG. 2, a first area 151 and a second area 152 that are both shaped to be long in the main scanning direction 214, that are mutually separated in the sub scanning direction 215, and that have different reflection characteristics, are formed on the document holding surface 15 facing the document sheet placement surface 211 of the ADF 1. In addition, as shown in FIG. 2, a third area 153 and a fourth area 154 that are disposed at positions corresponding to irradiation positions of light from each of the document sheet detection sensors 29A and 29B and that have different reflection characteristics are formed on the document holding surface 15. Here, the reflection characteristic is reflectance of light. Specifically, in the image forming apparatus 10, the document holding surface 15 is formed with a white sheet-like member, and the second area 152 and the fourth area 154 are areas where the document holding surface 15 is colored black. The first area 151 and the third area 153 are areas that are white as the document holding surface 15.

In addition, as shown in FIG. 2, a fifth area 155 and a sixth area 156 that are both shaped to be long in the main scanning direction 214, that are both disposed at positions separated from the first area 151 and the second area 152 in the sub scanning direction 215, and that respectively have the same reflection characteristic as the first area 151 and the same reflection characteristic as the second area 152, are formed on the document holding surface 15. Specifically, on the document holding surface 15, the fifth area 155 is an area that is white as the first area 151, and the sixth area 156 is an area that is black as the second area 152.

As shown in FIG. 3, the control portion 5 includes an opening-and-closing detection portion 51, a first reading control portion 52, a first document sheet width detection portion 53, a first size detection portion 54, a pre-closure detection portion 55, a second reading control portion 56, a second document sheet width detection portion 57, a second size detection portion 58, a storage control portion 59, a first state control portion 60, a second state control portion 61, a size detection control portion 62, a third reading control portion 63, a tilt detection portion 64, a notification portion 65, and a data conversion portion 66.

Specifically, a first size detection program, a second size detection program, and a size detection control program for respectively causing the CPU to execute a first size detection process (see FIG. 6), a second size detection process (see FIG. 4), and a size detection control process (see FIG. 5) described later are stored in advance in the ROM and the EEPROM of the control portion 5. It should be noted that the first size detection program, the second size detection program, and the size detection control program may be stored in a computer-readable storage medium such as a CD, a DVD, or a flash memory, and may be read from the storage medium and installed in a storage portion such as the EEPROM of the control portion 5.

By using the CPU to execute the first size detection program, the second size detection program, and the size detection control program stored in the ROM; the control portion 5 functions as the opening-and-closing detection portion 51, the first reading control portion 52, the first document sheet width detection portion 53, the first size detection portion 54, the pre-closure detection portion 55, the second reading control portion 56, the second document sheet width detection portion 57, the second size detection portion 58, the storage control portion 59, the first state control portion 60, the second state control portion 61, the size detection control portion 62, the third reading control portion 63, the tilt detection portion 64, the notification portion 65, and the data conversion portion 66. It should be noted that, when the control portion 5 is an electronic circuit, each of the opening-and-closing detection portion 51, the first reading control portion 52, the first document sheet width detection portion 53, the first size detection portion 54, the pre-closure detection portion 55, the second reading control portion 56, the second document sheet width detection portion 57, the second size detection portion 58, the storage control portion 59, the first state control portion 60, the second state control portion 61, the size detection control portion 62, the third reading control portion 63, the tilt detection portion 64, the notification portion 65, and the data conversion portion 66 is formed as a module included in the control portion 5.

The opening-and-closing detection portion 51 detects the open/closed states of the ADF 1. Specifically, the opening-and-closing detection portion 51 detects the open/closed states of the ADF 1 based on electrical signals that are each outputted from the opening-and-closing detection sensor 27 and corresponding to the open state and the closed state.

The first reading control portion 52 causes the image reading portion 2 to read image data of each of the first area 151 and the second area 152 when the ADF 1 is closed with respect to the document sheet placement surface 211. Specifically, the first reading control portion 52 causes the image reading portion 2 to read the image data when a closed state of the ADF 1 is detected by the opening-and-closing detection portion 51.

The first document sheet width detection portion 53 is configured to detect, as a width of the document sheet in the main scanning direction 214, a width that is larger between a width, specified based on the image data read from the first area 151 by the first reading control portion 52, of the document sheet in the main scanning direction 214, and a width, specified based on the image data read from the second area 152 by the first reading control portion 52, of the document sheet in the main scanning direction 214.

Specifically, for each pixel included in the image data corresponding to the first area 151, the first document sheet width detection portion 53 detects the presence or absence of a density change that is toward a smaller density and that is larger than a preset threshold, from an end part on the side of the placement reference position 213 in the main scanning direction 214 to the other end part. Then, among the pixels detected to have a density change that is larger than the threshold, a pixel position of an outermost pixel is identified as an edge of the document sheet, and the width of the document sheet in the main scanning direction 214 is specified based on the identified edge of the document sheet. For example, it is conceivable to set the threshold to 128 when the density of a pixel in image data is represented in 256 gradations.

On the other hand, for each pixel included in the image data corresponding to the second area 152, the first document sheet width detection portion 53 detects the presence or absence of a density change that is toward a larger density and that is larger than the threshold, from the end part on the side of the placement reference position 213 in the main scanning direction 214 to the other end part. Then, among the pixels detected to have a density change that is larger than the threshold, a pixel position of an outermost pixel is identified as an edge of the document sheet, and the width of the document sheet in the main scanning direction 214 is specified based on the identified edge of the document sheet.

The first size detection portion 54 can detect the size of the document sheet placed on the document sheet placement surface 211 based on detection results from the first document sheet width detection portion 53 and the document sheet detection sensors 29A and 29B. Specifically, the first size detection portion 54 causes the light emitting portion of the document sheet detection sensor 29A to emit light toward the third area 153, and determines that a document sheet is placed on the position that is irradiated by the light from the light emitting portion, when the electrical signal outputted from the light receiving portion becomes smaller than a predetermined first output value. The first output value is determined based on an output value outputted from the light receiving portion when light reflected by the third area 153 is received. Furthermore, the first size detection portion 54 causes the light emitting portion of the document sheet detection sensor 29B to emit light toward the fourth area 154, and determines that a document sheet is placed on the position irradiated by light from the light emitting portion, when the electrical signal outputted from the light receiving portion becomes larger than a predetermined second output value. The second output value is determined based on an output value outputted from the light receiving portion when light reflected by the fourth area 154 is received.

In addition, the first size detection portion 54 extracts a document sheet size that is consistent with the width of the document sheet detected by the first document sheet width detection portion 53, based on data indicating dimensions of various document sheet sizes stored in the storage portion such as the EEPROM in advance. Then, when a single document sheet size is extracted, the first size detection portion 54 detects the extracted document sheet size as the size of the document sheet placed on the document sheet placement surface 211. On the other hand, when multiple document sheet sizes are extracted, the first size detection portion 54 detects the size of the document sheet by specifying the size of the document sheet based on detection results from the document sheet detection sensors 29A and 29B. For example, when the width of the document sheet detected by the first document sheet width detection portion 53 is consistent with sizes of A4 portrait and A3 landscape, and when the detection results from the document sheet detection sensors 29A and 29B indicate a document sheet being present, the first size detection portion 54 determines the size of the document sheet placed on the document sheet placement surface 211 as A3 landscape. Furthermore, when the width of the document sheet detected by the first document sheet width detection portion 53 is consistent with sizes of A4 portrait and A3 landscape, and when the detection results from the document sheet detection sensors 29A and 29B indicate a document sheet being absent, the first size detection portion 54 determines the size of the document sheet placed on the document sheet placement surface 211 as A4 portrait.

The pre-closure detection portion 55 detects that the ADF 1 is closed down to the pre-closure angle. Specifically, the pre-closure detection portion 55 detects that the ADF 1 is closed down to the pre-closure angle based on an electrical signal outputted from the pre-closure detection sensor 28.

When the ADF 1 is detected by the pre-closure detection portion 55 to be closed down from the open state to the pre-closure angle, and after the closed state of the ADF 1 is detected by the opening-and-closing detection portion 51; the second reading control portion 56 causes the image reading portion 2 to read the image data of the document sheet at a position corresponding to the first area 151.

The second document sheet width detection portion 57 is configured to detect, as a width of the document sheet in the main scanning direction 214, a width that is larger between a width, specified based on the image data read by the second reading control portion 56 when the ADF 1 is closed down to the pre-closure angle, of the document sheet in the main scanning direction 214, and a width, specified based on the image data read after the ADF 1 is closed, of the document sheet in the main scanning direction 214. It should be noted that the method for specifying the width of the document sheet by the second document sheet width detection portion 57 based on the image data read when the ADF 1 is closed down to the pre-closure angle is similar to that performed by the first document sheet width detection portion 53 with the image data corresponding to the second area 152. In addition, the method for specifying the width of the document sheet by the second document sheet width detection portion 57 based on the image data read after the ADF 1 is closed is similar to that performed by the first document sheet width detection portion 53 with the image data corresponding to the first area 151.

The second size detection portion 58 detects the size of the document sheet based on detection results from the second document sheet width detection portion 57 and the document sheet detection sensors 29A and 29B. It should be noted that the method for detecting the size of the document sheet by the second size detection portion 58 is similar to that performed by the first size detection portion 54.

The storage control portion 59 stores only the latest detected detection result in the storage portion, among the detection results from the first size detection portion 54 and the second size detection portion 58. Specifically, every time the size of the document sheet is detected by the first size detection portion 54 and the second size detection portion 58, the storage control portion 59 overwrites and stores the detection result in a predetermined area in the RAM.

When a predetermined state transition condition is satisfied, the first state control portion 60 causes the image forming apparatus 10 to transition from an operation state to a standby state in which operations are partially restricted. For example, when a state in which a user has not performed any operations with respect to the ADF 1 and the operation display portion 7 has continued for a predetermined period of time, the image forming apparatus 10 shifts from the operation state to the standby state. The image forming apparatus 10 may shift from the operation state to the standby state in response to a predetermined operation performed with respect to the operation display portion 7 by the user.

When the open state of the ADF 1 is detected by the opening-and-closing detection portion 51, the second state control portion 61 causes the image forming apparatus 10 to transition from the standby state to the operation state.

When a transition from the standby state to the operation state occurs without a control by the second state control portion 61, and when the detection results from the first size detection portion 54 and the second size detection portion 58 are stored in the RAM; the size detection control portion 62 restricts detection of document sheet size by the first reading control portion 52 and the first size detection portion 54, and detects the detection results stored in the RAM as the size of the document sheet. For example, when an operation is performed with respect to the operation display portion 7 by the user, the image forming apparatus 10 shifts from the standby state to the operation state.

The third reading control portion 63 causes the image reading portion 2 to read image data of the fifth area 155 or the sixth area 156 when the ADF 1 is closed with respect to the document sheet placement surface 211. Specifically, when the width of the document sheet is detected by the first document sheet width detection portion 53 based on the image data corresponding to the first area 151, the third reading control portion 63 causes the image data of the fifth area 155 to be read. Furthermore, when the width of the document sheet is detected by the first document sheet width detection portion 53 based on the image data corresponding to the second area 152, the third reading control portion 63 causes the image data of the sixth area 156 to be read. The third reading control portion 63 causes the image reading portion 2 to read the image data when the closed state of the ADF 1 is detected by the opening-and-closing detection portion 51.

The tilt detection portion 64 can detect a tilt of the document sheet based on either the image data of both the first area 151 and the fifth area 155, or the image data of both the second area 152 and the sixth area 156. Specifically, the tilt detection portion 64 detects the tilt of the document sheet with respect to the sub scanning direction 215 based on the position of the edge of the document sheet specified from the image data corresponding to the first area 151 or the second area 152, and the position of the edge of the document sheet specified from the image data corresponding to the fifth area 155 or the sixth area 156. It should be noted that when the image data of the fifth area 155 is read by the third reading control portion 63, the tilt detection portion 64 detects the tilt of the document sheet based on the image data of both the first area 151 and the fifth area 155. Furthermore, when the image data of the sixth area 156 is read by the third reading control portion 63, the tilt detection portion 64 detects the tilt of the document sheet based on the image data of both the second area 152 and the sixth area 156.

The notification portion 65 provides a notification regarding the tilt of the document sheet detected by the tilt detection portion 64. For example, when the tilt of the document sheet with respect to the sub scanning direction 215 detected by the tilt detection portion 64 is larger than an acceptable angle set in advance, the notification portion 65 provides a notification by displaying such information on the operation display portion 7. It is also conceivable for the notification portion 65 to provide a notification about the tilt of the document sheet detected by the tilt detection portion 64 being larger than the acceptable angle by sounding an alarm. For example, the acceptable angle is 5 to 10 degrees.

Among the image data of the document sheet read by the image reading portion 2, the data conversion portion 66 converts, to white image data, black image data, within an area of the size of the document sheet detected by the first size detection portion 54, contained in image data corresponding to both end parts in the main scanning direction 214 of the second area 152.

[Second Size Detection Process]

Figure 4:
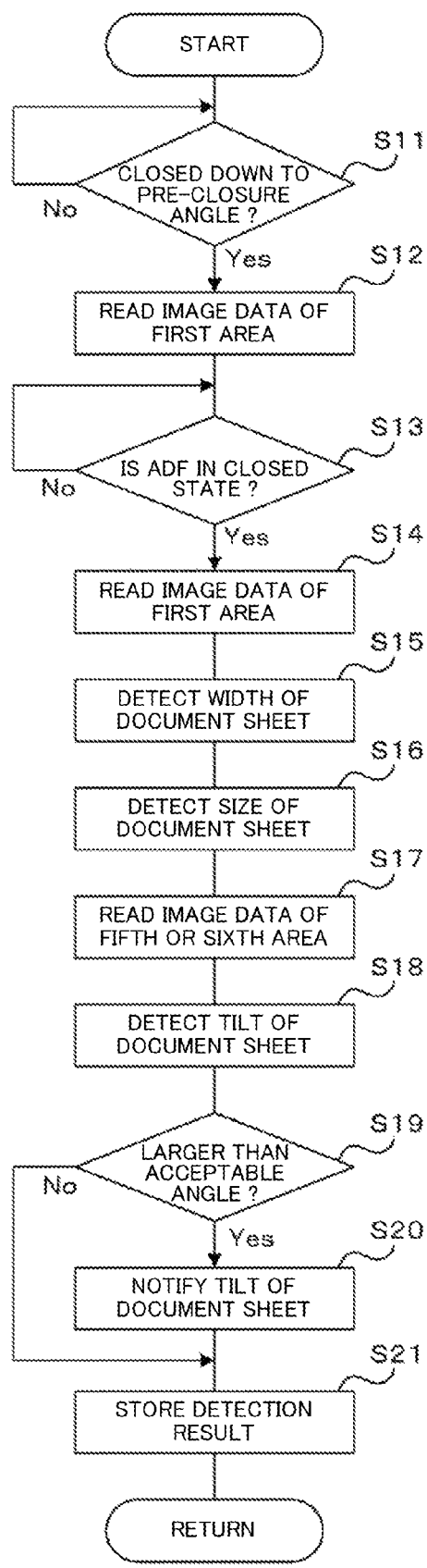
FIG. 4 is a flowchart showing one example of a second size detection process executed by the image forming apparatus according to the embodiment of the present invention.

In the following, for convenience of description, first, one example of procedures of a second size detection process executed by the control portion 5 in accordance with the second size detection program in the image forming apparatus 10 will be described with reference to FIG. 4. The second size detection process is a process for detecting the size of the document sheet placed on the document sheet placement surface 211 when an operation of opening-and-closing the ADF 1 is performed. Here, steps S11, S12, etc., represent numbers of processing procedures (steps) executed by the control portion 5. It should be noted that a first size detection process for detecting the size of the document sheet when the operation of opening-and-closing the ADF 1 is not performed will be described later.

<Step S11>

First, at step S11, the control portion 5 determines whether or not the ADF 1 is closed down to the pre-closure angle. Specifically, the control portion 5 determines whether or not the ADF 1 is closed down to the pre-closure angle based on an electrical signal outputted from the pre-closure detection sensor 28. Here, the process of step S11 is executed by the pre-closure detection portion 55 of the control portion 5.

When the control portion 5 determines that the ADF 1 is closed down to the pre-closure angle at this point ("Yes" side at S11), the control portion 5 shifts the process to step S12. When the ADF 1 is not closed down to the pre-closure angle ("No" side at S11), the control portion 5 waits until the ADF 1 is closed down to the pre-closure angle at step S11.

<Step S12>

At step S12, the control portion 5 causes the image reading portion 2 to read the image data of the document sheet at the position corresponding to the first area 151. More specifically, at step S12, part way through while the ADF 1 is being closed, the image data is read.

<Step S13>

At step S13, the control portion 5 determines whether or not the ADF 1 is in the closed state with respect to the document sheet placement surface 211. Specifically, the control portion 5 determines whether or not the ADF 1 is in the closed state with respect to the document sheet placement surface 211 based on an electrical signal outputted from the opening-and-closing detection sensor 27. Here, the process of step S13 is executed by the opening-and-closing detection portion 51 of the control portion 5.

When the control portion 5 determines that the ADF 1 is in the closed state with respect to the document sheet placement surface 211 ("Yes" side at S13), the control portion 5 shifts the process to step S14. When the ADF 1 is not in the closed state with respect to the document sheet placement surface 211 ("No" side at S13), the control portion 5 waits until the ADF 1 enters the closed state with respect to the document sheet placement surface 211 at step S13.

<Step S14>

At step S14, the control portion 5 causes the image reading portion 2 to read the image data of the document sheet at the position corresponding to the first area 151. More specifically, at step S14, the image data is read after the ADF 1 is closed. Here, the processes of step S12 and step S14 are executed by the second reading control portion 56 of the control portion 5.

<Step S15>

At step S15, the control portion 5 detects, as a width of the document sheet in the main scanning direction 214, a width that is larger between a width, specified based on the image data read at step S12, of the document sheet in the main scanning direction 214, and a width, specified based on the image data read at step S14, of the document sheet in the main scanning direction 214.

Specifically, for each pixel included in the image data read at step S12, the control portion 5 detects the presence or absence of a density change that is toward a larger density and that is larger than the threshold, from the end part on the side of the placement reference position 213 in the main scanning direction 214 to the other end part. Then, among the pixels detected to have a density change that is larger than the threshold, a pixel position of an outermost pixel is identified as an edge of the document sheet, and the width of the document sheet in the main scanning direction 214 is specified based on the identified edge of the document sheet.

On the other hand, for each pixel included in the image data read at step S14, the control portion 5 detects the presence or absence of a density change that is toward a smaller density and that is larger than the threshold, from the end part on the side of the placement reference position 213 in the main scanning direction 214 to the other end part. Then, among the pixels detected to have a density change that is larger than the threshold, a pixel position of an outermost pixel is identified as an edge of the document sheet, and the width of the document sheet in the main scanning direction 214 is specified based on the identified edge of the document sheet.

Then, the control portion 5 detects, as a width of the document sheet in the main scanning direction 214, a width that is larger between the specified two widths of the document sheet. Here, when the document sheet placed on the document sheet placement surface 211 is whitish, the width of the document sheet is detected from the image data read at step S12. On the other hand, when the document sheet placed on the placement surface 211 is blackish, the width of the document sheet is detected from the image data read at step S14. Here, the process of step S15 is executed by the second document sheet width detection portion 57 of the control portion 5.

<Step S16>

At step S16, the control portion 5 detects the size of the document sheet based on detection results from step S15 and the document sheet detection sensors 29A and 29B. Specifically, the control portion 5 causes the light emitting portion of the document sheet detection sensor 29A to emit light toward the third area 153, and determines that a document sheet is placed on the position irradiated by the light from the light emitting portion, when the electrical signal outputted from the light receiving portion becomes smaller than the first output value. Here, placement of a blackish document sheet is detected by the document sheet detection sensor 29A. Furthermore, the control portion 5 causes the light emitting portion of the document sheet detection sensor 29B to emit light toward the fourth area 154, and determines that a document sheet is placed on the position irradiated by the light from the light emitting portion, when the electrical signal outputted from the light receiving portion becomes larger than the second output value. Here, placement of a whitish document sheet is detected by the document sheet detection sensor 29B.

Furthermore, the control portion 5 extracts a document sheet size that is consistent with the width of the document sheet detected at step S15, based on data indicating dimensions of various document sheet sizes stored in the EEPROM. Then, when a single document sheet size is extracted, the control portion 5 detects the extracted document sheet size as the size of the document sheet placed on the document sheet placement surface 211. On the other hand, when multiple document sheet sizes are extracted, the control portion 5 detects the size of the document sheet by specifying the size of the document sheet based on detection results from the document sheet detection sensors 29A and 29B. Here, the process of step S16 is executed by the second size detection portion 58 of the control portion 5.

<Step S17>

At step S17, the control portion 5 causes the image reading portion 2 to read the image data of the fifth area 155 or the sixth area 156. Specifically, when the width of the document sheet is detected at step S15 based on the image data read at step S14, the control portion 5 causes the image reading portion 2 to read the image data of the fifth area 155. Furthermore, when the width of the document sheet is detected at step S15 based on the image data read at step S12, the control portion 5 causes the image reading portion 2 to read the image data of the sixth area 156.

<Step S18>

At step S18, the control portion 5 detects the tilt of the document sheet based on the image data used for detecting the width of the document sheet at step S15 and the image data read at step S17. Specifically, the control portion 5 detects the tilt of the document sheet with respect to the sub scanning direction 215 based on the position of the edge of the document sheet specified from the image data used for detecting the width of the document sheet at step S15, and the position of the edge of the document sheet specified from the image data read at step S17.

<Step S19>

At step S19, the control portion 5 determines whether or not the tilt of the document sheet with respect to the sub scanning direction 215 detected at step S18 is larger than the acceptable angle.

Here, when the control portion 5 determines that the tilt of the document sheet detected at step S18 is larger than the acceptable angle ("Yes" side at S19), the control portion 5 shifts the process to step S20. In addition, when the tilt of the document sheet detected at step S18 is not larger than the acceptable angle ("No" side at S19), the control portion 5 shifts the process to step S21.

<Step S20>

At step S20, the control portion 5 provides a notification by displaying, on the operation display portion 7, information regarding the tilt of the document sheet detected at step S18 being larger than the acceptable angle.

<Step S21>

At step S21, the control portion 5 overwrites and stores the size of the document sheet detected at step S16, in the area of the RAM. In addition, when the tilt of the document sheet detected at step S18 is larger than the acceptable angle, the control portion 5 also stores that in the RAM. Then, the control portion 5 shifts the process to step S11. With this, in a later described size detection control process, it becomes possible to detect the size and tilt of the document sheet based on information stored in the RAM. Here, the process of step S21 is executed by the storage control portion 59 of the control portion 5.

As described above, in the second size detection process, the size and tilt of the document sheet placed on the document sheet placement surface 211 when the ADF 1 is closed are detected. In the second size detection process, it is conceivable to omit the processes of steps S17 to S20 and not detect the tilt of the document sheet. With this, since the process for detecting the tilt of the document sheet after the ADF 1 is closed is omitted, an image reading process of a document sheet can be started earlier in the image forming apparatus 10 accordingly.

[Size Detection Control Process]

Figure 5:
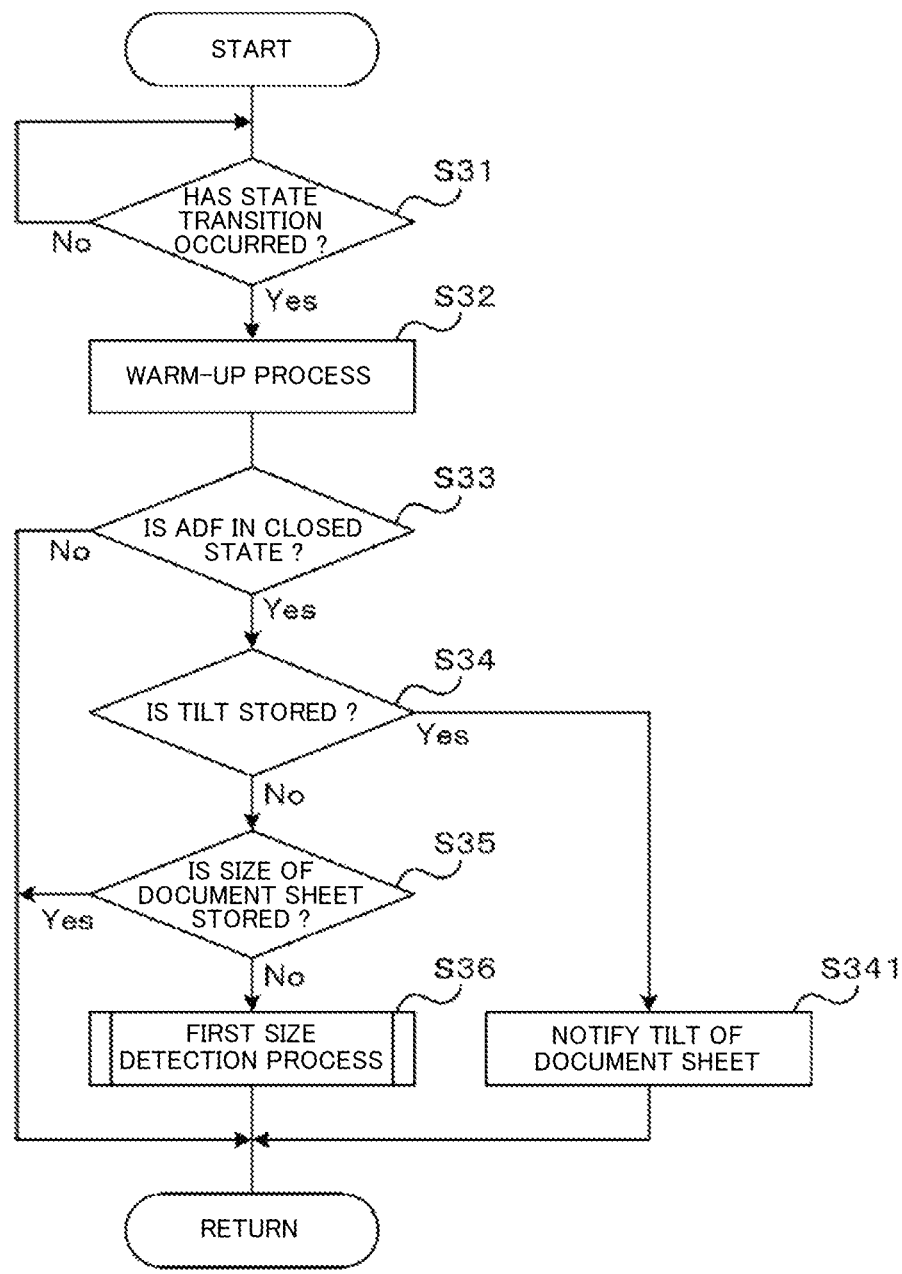
FIG. 5 is a flowchart showing one example of a size detection control process executed by the image forming apparatus according to the embodiment of the present invention.

Next, one example of procedures of a size detection control process executed by the control portion 5 in accordance with the size detection control program in the image forming apparatus 10 will be described with reference to FIG. 5. In the image forming apparatus 10, the second size detection process and the size detection control process are executed in parallel by the control portion 5.

<Step S31>

First, at step S31, the control portion 5 determines whether or not there has been a state transition from a power OFF-state or the standby state to the operation state in the image forming apparatus 10.

Here, when the control portion 5 determines that there has been a state transition to the operation state in the image forming apparatus 10 ("Yes" side at S31), the control portion 5 shifts the process to step S32. Furthermore, when there is no state transition to the operation state in the image forming apparatus 10 ("No" side at S31), the control portion 5 waits for the state transition to the operation state at step S31. It should be noted that the condition for executing the processes subsequent to step S32 described below is not limited to the state transition, and, for example, the condition may be a request for executing a scan job, a copy job, or a facsimile job that involves an image reading process by the image reading portion 2.

<Step S32>

At step S32, the control portion 5 executes a warm-up process of the image reading portion 2. The warm-up process includes, for example, moving the reading unit 22 to a predetermined home position, detection of any malfunction in lighting of the light source 221, adjusting output of PGA, and acquiring a reference value for shading correction, etc.

<Step S33>

Similarly to step S13 described above, at step S33, the control portion 5 determines whether or not the ADF 1 is in the closed state with respect to the document sheet placement surface 211.

When the control portion 5 determines that the ADF 1 is in the closed state with respect to the document sheet placement surface 211 ("Yes" side at S33), the control portion 5 shifts the process to step S34. Furthermore, when the ADF 1 is not in the closed state with respect to the document sheet placement surface 211 ("No" side at S33), the control portion 5 shifts the process to step S31. More specifically, when the ADF 1 is in the open state, the size and tilt of the document sheet are detected by the second size detection process.

<Step S34>

At step S34, the control portion 5 determines whether or not information, regarding the tilt of the document sheet placed on the document sheet placement surface 211 being larger than the acceptable angle, is stored in the RAM. It should be noted that the information, regarding the tilt of the document sheet placed on the document sheet placement surface 211 being larger than the acceptable angle, is stored in the RAM by the control portion 5 at step S21 described above or step S49 described later.

Here, when the control portion 5 determines that information, regarding the tilt of the document sheet placed on the document sheet placement surface 211 being larger than the acceptable angle, is stored in the RAM ("Yes" side at S34), the control portion 5 shifts the process to step S341. Furthermore, when information, regarding the tilt of the document sheet placed on the document sheet placement surface 211 being larger than the acceptable angle, is not stored in the RAM ("No" side at S34), the control portion 5 shifts the process to step S35.

<Step S341>

Similarly to step S20 described above, at step S341, the control portion 5 provides a notification by displaying, on the operation display portion 7, information stored in the RAM regarding the tilt of the document sheet being larger than the acceptable angle.

More specifically, in the image forming apparatus 10, the first state control portion 60 of the control portion 5 causes a state transition from the operation state to the standby state to occur when the state transition condition is satisfied. Furthermore, in the image forming apparatus 10, the second state control portion 61 of the control portion 5 causes a state transition from the standby state to the operation state to occur when the open state of the ADF 1 is detected. Thus, when the image forming apparatus 10 undergoes the state transition from the standby state to the operation state ("Yes" side at step S31), and when the ADF 1 is in the closed state ("Yes" side at step S33); the document sheet whose size and tilt have been detected by the second size detection process is still placed on the document sheet placement surface 211 when the ADF 1 has been last closed, and it is possible to detect the size and tilt of the document sheet using the information stored in the RAM at step S21 in the second size detection process. It should be noted that, since the information is stored in the RAM at step S21 in the second size detection process, the information will not be remaining in the RAM when the image forming apparatus 10 undergoes a state transition from the power OFF-state to the operation state.

<Step S35>

At step S35, the control portion 5 determines whether or not the size of the document sheet placed on the document sheet placement surface 211 is stored in the RAM. It should be noted that the information regarding the size of the document sheet placed on the document sheet placement surface 211 is stored in the RAM by the control portion 5 at step S21 described above or step S49 described later.

Here, when the control portion 5 determines that the size of the document sheet placed on the document sheet placement surface 211 is stored in the RAM ("Yes" side at S35), the control portion 5 shifts the process to step S31. More specifically, similarly to step S341 described above, the size of the document sheet placed on the document sheet placement surface 211 is detected based on the information stored in the RAM. Furthermore, when the size of the document sheet placed on the document sheet placement surface 211 is not stored in the RAM ("No" side at S35), the control portion 5 shifts the process to step S36. Here, the process of step S35 is executed by the size detection control portion 62 of the control portion 5.

<Step S36>

At step S36, the control portion 5 executes a first size detection process described later in accordance with the first size detection program. Then, after the first size detection process ends, the control portion 5 shifts the process to step S31.

[First Size Detection Process]

Figure 6:
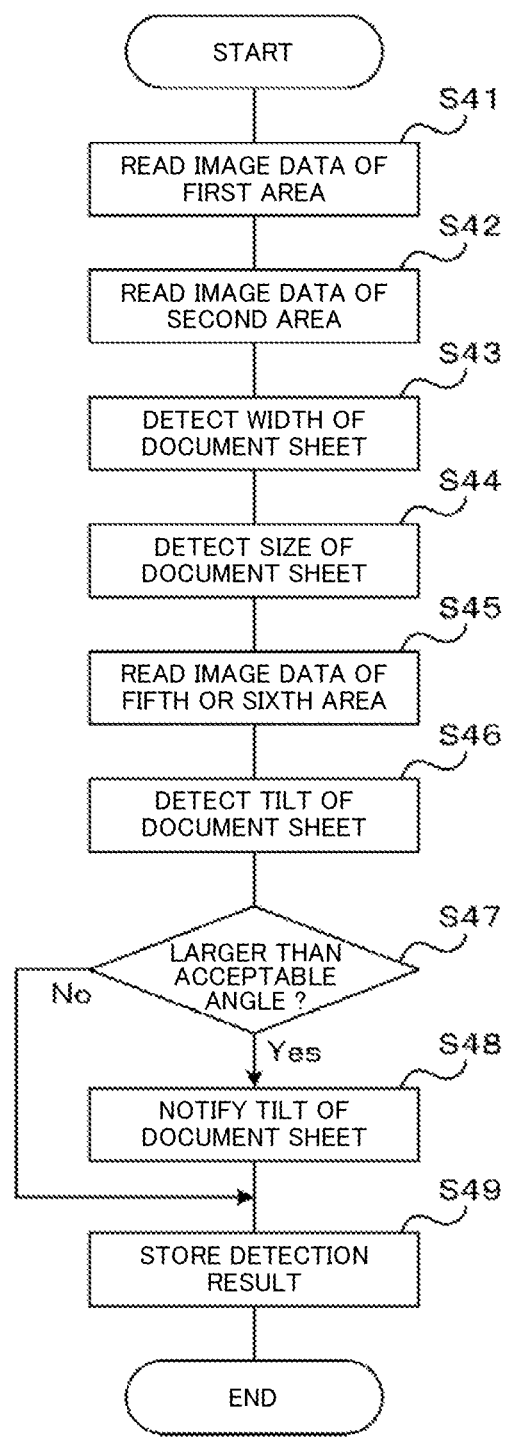
FIG. 6 is a flowchart showing one example of a first size detection process executed by the image forming apparatus according to the embodiment of the present invention.

Next, one example of procedures of the first size detection process executed by the control portion 5 in accordance with the first size detection program in the image forming apparatus 10 will be described with reference to FIG. 6.

<Step S41>

First, at step S41, the control portion 5 causes the image reading portion 2 to read the image data of the first area 151.

<Step S42>

At step S42, the control portion 5 causes the image reading portion 2 to read the image data of the second area 152. Here, the processes of step S41 and step S42 are one example of a first step, and are executed by the first reading control portion 52 of the control portion 5.

<Step S43>

At step S43, the control portion 5 detects, as a width of the document sheet in the main scanning direction 214, a width that is larger between a width, specified based on the image data read at step S41, of the document sheet in the main scanning direction 214, and a width, specified based on the image data read at step S42, of the document sheet in the main scanning direction 214. It should be noted that the method for specifying the width of the document sheet in the main scanning direction 214 based on the image data read at step S41 is similar to the method for specifying the width of the document sheet in the main scanning direction 214 at step S15 based on the image data read at step S14 in the second size detection process. In addition, the method for specifying the width of the document sheet in the main scanning direction 214 based on the image data read at step S42 is similar to the method for specifying the width of the document sheet in the main scanning direction 214 at step S15 based on the image data read at step S12 in the second size detection process. More specifically, when the document sheet placed on the document sheet placement surface 211 is whitish, the width of the document sheet is detected from the image data read at step S42. Furthermore, when the document sheet placed on the document sheet placement surface 211 is blackish, the width of the document sheet is detected from the image data read at step S41. Here, the process of step S43 is one example of a second step, and is executed by the first document sheet width detection portion 53 of the control portion 5.

<Step S44>

At step S44, the control portion 5 detects the size of the document sheet based on detection results from step S43 and the document sheet detection sensors 29A and 29B. It should be noted that the method for detecting the size of the document sheet is similar to that in the case of step S16 in the second size detection process. Here, the process of step S44 is one example of a third step, and is executed by the first size detection portion 54 of the control portion 5.

<Step S45>

Similarly to the case of step S17 described above in the second size detection process, at step S45, the control portion 5 causes the image reading portion 2 to read the image data of the fifth area 155 or the sixth area 156. Specifically, when the width of the document sheet is detected at step S43 based on the image data read at step S41, the control portion 5 causes the image reading portion 2 to read the image data of the fifth area 155. Furthermore, when the width of the document sheet is detected at step S43 based on the image data read at step S42, the control portion 5 causes the image reading portion 2 to read the image data of the sixth area 156. Here, the process of step S45 is executed by the third reading control portion 63 of the control portion 5.

<Step S46>

Similarly to the case of step S18 described above in the second size detection process, at step S46, the control portion 5 detects the tilt of the document sheet based on the image data used for detecting the width of the document sheet at step S43 and the image data read at step S45. Specifically, the control portion 5 detects the tilt of the document sheet with respect to the sub scanning direction 215 based on the position of the edge of the document sheet specified from the image data used for detecting the width of the document sheet at step S43, and the position of the edge of the document sheet specified from the image data read at step S45. Here, the process of step S46 is executed by the tilt detection portion 64 of the control portion 5.

<Step S47>

Similarly to the case of step S19 described above in the second size detection process, at step S47, the control portion 5 determines whether or not the tilt of the document sheet with respect to the sub scanning direction 215 detected at step S46 is larger than the acceptable angle.

Here, when the control portion 5 determines that the tilt of the document sheet detected at step S46 is larger than the acceptable angle ("Yes" side at S47), the control portion 5 shifts the process to step S48. In addition, when the tilt of the document sheet detected at step S46 is not larger than the acceptable angle ("No" side at S47), the control portion 5 shifts the process to step S49.

<Step S48>

Similarly to the case of step S20 described above in the second size detection process, at step S48, the control portion 5 provides a notification by displaying information regarding the tilt of the document sheet detected at step S46 being larger than the acceptable angle, on the operation display portion 7. With this, the user can recognize that the document sheet placed on the document sheet placement surface 211 is tilted more than the acceptable angle, and correct the placement of the document sheet. Here, the process of step S48 is executed by the notification portion 65 of the control portion 5.

<Step S49>

Similarly to the case of step S21 described above in the second size detection process, at step S49, the control portion 5 overwrites and stores the size of the document sheet detected at step S44, in the area of the RAM. In addition, when the tilt of the document sheet detected at step S46 is larger than the acceptable angle, the control portion 5 also stores that in the RAM. Then, the control portion 5 ends the first size detection process. With this, at step S34 and step S35 in the size detection control process, it becomes possible to detect the size and tilt of the document sheet based on information stored in the RAM.

As described above, in the first size detection process, the size and tilt of whitish and blackish document sheets placed on the document sheet placement surface 211 are detected, when the image forming apparatus 10 undergoes a state transition from the OFF-state or the standby state to the operation state, and when the ADF 1 is closed. Thus, even when a whitish document sheet is placed on the document sheet placement surface 211 and the ADF 1 is closed while the power of the image forming apparatus 10 is turned off, the user can have the image forming apparatus 10 detect the size and tilt of the document sheet without the need of an opening-and-closing operation of the ADF 1. The same also applies when the user places a whitish document sheet on the document sheet placement surface 211 and closes the ADF 1 while the image forming apparatus 10 is in the standby state.

Furthermore, in the size detection control process, when the document sheet whose size and tilt are detected in the first size detection process or the second size detection process is still left on the document sheet placement surface 211; execution of the first size detection process becomes restricted, and the size and tilt of the document sheet are detected based on the detection result from the first size detection process or the second size detection process stored in the RAM. With this, detection of the size and tilt of the same document sheet again is avoided.

The size of the document sheet detected by the first size detection process or the second size detection process is subsequently utilized for controlling reading operation and image processing of read image data by the reading unit 22, in the image reading process for the document sheet executed in the image forming apparatus 10. Since the second area 152 and the sixth area 156, which are areas colored black, are formed on the document holding surface 15; the end part in the main scanning direction 214 of the image data of the document sheet read in the image reading process is considered to be black. Thus, in the image forming apparatus 10, the data conversion portion 66 of the control portion 5 converts, to white image data, black image data, within an area of the size of the document sheet detected by the first size detection process or the second size detection process, contained in the image data corresponding to both end parts in the main scanning direction 214 of the second area 152 and the sixth area 156, among the image data of the document sheet read by the image reading portion 2. With this, the second area and the sixth area are prevented from being imaged in the image data of the document sheet read by the image reading process.

When the third area 153 and the fourth area 154 are formed near the center in the main scanning direction 214 of the document holding surface 15, it is thought that erroneous detections may occur in the document sheet detection sensors 29A and 29B. Specifically, erroneous detections occur in the document sheet detection sensors 29A and 29B when the color of the portions that are in the document sheet placed on the document sheet placement surface 211 and that correspond to the third area 153 and the fourth area 154 match the colors of the third area 153 and the fourth area 154. Thus, it is conceivable to form the third area 153 in white, and form the fourth area 154 into a mirror surface with a reflection characteristic of having a high reflectance not contained in an ordinary document sheet. With this, erroneous detections in the document sheet detection sensors 29A and 29B are prevented. Other conceivable embodiments include coloring the fourth area 154 in yellow.

The invention claimed is:

1. An image forming apparatus comprising:
an image reading portion capable of reading image data of a document sheet placed on a document sheet placement surface;
two document sheet detection portions configured to detect reflected light when light is emitted on a document sheet through the document sheet placement surface, and disposed at positions that are mutually separated in a main scanning direction on the document sheet placement surface and that are both separated from a predetermined placement reference position on the document sheet placement surface by a predetermined distance in a sub scanning direction;
a document sheet cover including a document holding surface that faces the document sheet placement surface and on which first and second areas that are both shaped to be long in the main scanning direction, that are mutually separated in the sub scanning direction, and that have different reflection characteristics, and third and fourth areas that are formed at positions corresponding to irradiation positions of light from the two document sheet detection portions and that have different reflection characteristics, are formed;
a first reading control portion configured to cause the image reading portion to read image data of each of the first and second areas, when the document sheet cover is closed with respect to the document sheet placement surface;
a first document sheet width detection portion configured to detect, as a width of the document sheet in the main scanning direction, a width that is larger between a width, specified based on the image data read from the first area by the first reading control portion, of the document sheet in the main scanning direction, and a width, specified based on the image data read from the second area by the first reading control portion, of the document sheet in the main scanning direction; and
a first size detection portion capable of detecting a size of the document sheet placed on the document sheet placement surface based on detection results from the first document sheet width detection portion and the two document sheet detection portions.

2. The image forming apparatus according to claim 1, wherein the first area is white and the second area is black.

3. The image forming apparatus according to claim 2, further comprising a data conversion portion configured to transform, to white image data, black image data, within an area of the size of the document sheet detected by the first size detection portion, contained in image data corresponding to both end parts in the main scanning direction of the second area, among the image data of the document sheet read by the image reading portion.

4. The image forming apparatus according to claim 1, wherein the third area is white and the fourth area is black.

5. The image forming apparatus according to claim 1, wherein the third area is white and the fourth area is a mirror surface.

6. The image forming apparatus according to claim 1, further comprising:
an opening-and-closing detection portion configured to detect open/closed states of the document sheet cover;
a pre-closure detection portion configured to detect closing of the document sheet cover down to a predetermined pre-closure angle;
a second reading control portion configured to cause the image reading portion to read image data of the document sheet at a position corresponding to the first area, when the document sheet cover is detected by the pre-closure detection portion to be closed down from an open state to the pre-closure angle, and after a closed state of the document sheet cover is detected by the opening-and-closing detection portion;
a second document sheet width detection portion configured to detect, as a width of the document sheet in the main scanning direction, a width that is larger between a width, specified based on the image data read by the second reading control portion when the document sheet cover is closed to the pre-closure angle, of the document sheet in the main scanning direction, and a width, specified based on the image data read after the document sheet cover is closed, of the document sheet in the main scanning direction;

a second size detection portion configured to detect a size of the document sheet based on detection results from the second document sheet width detection portion and the two document sheet detection portions;

a storage control portion configured to store only a latest detected detection result in a storage portion, among the detection results from the first size detection portion and the second size detection portion;

a first state control portion configured to, when a predetermined state transition condition is satisfied, cause the image forming apparatus to transition from an operation state to a standby state in which operations are partially restricted;

a second state control portion configured to, when the open state of the document sheet cover is detected by the opening-and-closing detection portion, cause the image forming apparatus to transition from the standby state to the operation state; and a size detection control portion configured to, when a transition from the standby state to the operation state occurs without a control by the second state control portion and when a detection result from the first size detection portion or the second size detection portion is stored in the storage portion, restrict detection of the size of the document sheet by the first reading control portion and the first size detection portion, and detect the detection result stored in the storage portion as the size of the document sheet.

7. The image forming apparatus according to claim 1, wherein:

the document holding surface has fifth and sixth areas that are both shaped to be long in the main scanning direction, that are both disposed at positions separated from the first area and the second area in the sub scanning direction, and that respectively have a same reflection characteristic as the first area and a same reflection characteristic as the second area; and the image forming apparatus further comprising a third reading control portion configured to cause the image reading portion to read image data of the fifth area or the sixth area when the document sheet cover is closed with respect to the document sheet placement surface, and a tilt detection portion capable of detecting a tilt of the document sheet based on either the image data of both the first area and the fifth area, or the image data of both the second area and the sixth area.

8. The image forming apparatus according to claim 7, further comprising a notification portion configured to provide notification regarding the tilt of the document sheet detected by the tilt detection portion.

9. A method for detecting a size of a document sheet, the method being performed in an image reading apparatus including: an image reading portion capable of reading image data of a document sheet placed on a document sheet placement surface; two document sheet detection portions configured to detect reflected light when light is emitted on a document sheet through the document sheet placement surface, and disposed at positions that are mutually separated in a main scanning direction on the document sheet placement surface and that are both separated from a predetermined placement reference position on the document sheet placement surface by a predetermined distance in a sub scanning direction; and a document sheet cover including a document holding surface that faces the document sheet placement surface and on which first and second areas that are both shaped to be long in the main scanning direction, that are mutually separated in the sub scanning direction, and that have different reflection characteristics, and third and fourth areas that are formed at positions corresponding to irradiation positions of light from the two document sheet detection portions and that have different reflection characteristics, are formed, the method comprising:

a first step of causing the image reading portion to read image data of each of the first and second areas when the document sheet cover is closed with respect to the document sheet placement surface;

a second step of detecting, as a width of the document sheet in the main scanning direction, a width that is larger between a width, specified based on the image data read from the first area at the first step, of the document sheet in the main scanning direction, and a width, specified based on the image data read from the second area at the first step, of the document sheet in the main scanning direction; and a third step capable of detecting a size of the document sheet placed on the document sheet placement surface based on detection results from the second step and the two document sheet detection portions.

* * * * *